United States Patent Office 2,831,030
Patented Apr. 15, 1958

2,831,030

COMPOSITION OF MATTER

Joseph A. Chenicek, Bensenville, Ill., assignor to Universal Oil Products Company, Des Plaines, Ill., a corporation of Delaware No Drawing. Application October 13, 1953
Serial No. 385,881

9 Claims. (Cl. 260—609)

This application is a continuation-in-part of my copending application Serial No. 121,906, filed October 17, 1949, now Patent No. 2,668,768, and relates to novel compositions of matter. The novel compositions of matter comprise 4-alkoxyphenols having at least one ring hydrogen substituted by an alkylthioalkyl group. These novel compositions are useful as antioxidants in retarding deterioration of organic compounds including edible fats and oils, lubricating oil, etc. Furthermore, these compounds exert a synergistic effect when used along with other known oxidation inhibitors and thus they may be used for this purpose. Still further, these compounds may be used as intermediates in the preparation of other organic compounds.

In one embodiment, the present invention relates to a novel composition of matter comprising a 4-alkoxyphenol having at least one ring hydrogen substituted by an alkylthioalkyl group.

The novel compounds of the present invention may be illustrated by the following general formula:

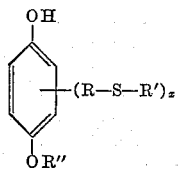

where S is sulfur, O is oxygen, R, R' and R" are hydrocarbon radicals and x is an integer of one or more.

In a preferred embodiment, R is a methylene group, R' is selected from the group consisting of alkyl, alkenyl, cycloalkyl, aryl, aralkyl and alkaryl, R" is an alkyl group containing from one to about five carbon atoms and x is an integer of from one to four.

Where R is methylene and R' is an alkyl radical, preferred compounds include 2-methylthiomethyl-4-methoxyphenol, 2 - ethylthiomethyl - 4 - methoxyphenol, 2-propylthiomethyl - 4 - methoxyphenol, 2 - butylthiomethyl - 4 - methoxyphenol, 2 - amylthiomethyl-4-methoxyphenol, 2 - hexylthiomethyl - 4 - methoxyphenol, 2 - heptylthiomethyl - 4 - methoxyphenol, 2 - octylthiomethyl - 4 - methoxyphenol, 2 - nonylthiomethyl - 4 - methoxyphenol, 2-decylthiomethyl-4-methoxyphenol, 2-undecylthiomethyl-4-methoxyphenol, 2-dodecylthiomethyl-4-methoxyphenol, etc. Other compounds in this class include 2-methylthiomethyl-4-ethoxyphenol, 2-ethylthiomethyl-4-ethoxyphenol, 2-propylthiomethyl-4-ethoxyphenol, 2-butylthiomethyl-4-ethoxyphenol, 2-amylthiomethyl-4-ethoxyphenol, 2-hexylthiomethyl-4-ethoxyphenol, 2-heptylthiomethyl-4-ethoxyphenol, 2-octylthiomethyl-4-ethoxyphenol, etc., 2-methylthiomethyl-4-propoxyphenol, 2-ethylthiomethyl-4-propoxyphenol, 2-propylthiomethyl-4-propoxyphenol, 2-butylthiomethyl-4-propoxyphenol, 2-amylthiomethyl - 4 - propoxyphenol, 2 - hexylthiomethyl - 4 - propoxyphenol, 2 - heptylthiomethyl - 4 - propoxyphenol, 2 - octylthiomethyl - 4 - propoxyphenol, etc., 2-methylthiomethyl-4-butoxyphenol, 2-ethylthiomethyl-4-butoxyphenol, 2-propylthiomethyl-4-butoxyphenol, 2-butylthiomethyl - 4 - butoxyphenol, 2 - amylthiomethyl - 4 - butoxyphenol, 2 - hexylthiomethyl - 4 - butoxyphenol, 2-heptylthiomethyl-4-butoxyphenol, 2-octylthiomethyl-4-butoxyphenol, etc., 2 - methylthiomethyl - 4 - pentoxyphenol, 2-ethylthiomethyl-4-pentoxyphenol, 2-propylthiomethyl-4-pentoxyphenol, 2-butylthiomethyl-4-pentoxyphenol, 2-amylthiomethyl-4-pentoxyphenol, 2-hexylthiomethyl-4-pentoxyphenol, 2-heptylthiomethyl-4-pentoxyphenol, 2-octylthiomethyl-4-pentoxyphenol, etc.

Still other compounds in this class include those containing two or more alkylthioalkyl groups and include such compounds as 2,6-di-(methylthiomethyl)-4-methoxyphenol, 2-6-di-(ethylthiomethyl)-4-methoxyphenol, 2,6-di-(propylthiomethyl)-4-methoxyphenol, 2,6-di-(butylthiomethyl)-4-methoxyphenol, 2,6-di-(amylthiomethyl)-4-methoxyphenol, 2,6-di-(hexylthiomethyl)-4-methoxyphenol, 2,6-di-(heptylthiomethyl)-4-methoxyphenol, 2,6-di-(octylthiomethyl)-4-methoxyphenol, etc., 2,6-di-(methylthiomethyl)-4-ethoxyphenol, 2,6-di-(ethylthiomethyl)-4-ethoxyphenol, 2,6-di-(propylthiomethyl)-4-ethoxyphenol, 2,6-di-(butylthiomethyl)-4-ethoxyphenol, 2,6-di-(amylthiomethyl)-4-ethoxyphenol, 2,6-di-(hexylthiomethyl)-4-ethoxyphenol, 2,6-di-(heptylthiomethyl)-4-ethoxyphenol, 2,6 - di - octylthiomethyl) - 4 - ethoxyphenol, etc., 2,6-di-(methylthiomethyl)-4-propoxyphenol, 2,6-di-(ethylthiomethyl)-4-propoxyphenol, 2,6-di-(propylthiomethyl)-4-propoxyphenol, 2,6-di-(butylthiomethyl)-4-propoxyphenol, 2,6-di-(amylthiomethyl)-4-propoxyphenol, 2,6-di-(hexylthiomethyl)-4-propoxyphenol, 2,6-di-(heptylthiomethyl) - 4 - propoxyphenol, 2,6 - di - (octylthiomethyl)-4-propoxyphenol, etc., 2,6-di-(methylthiomethyl)-4-butoxyphenol, 2,6-di-(ethylthiomethyl)-4-butoxyphenol, 2,6-di-(propylthiomethyl)-4-butoxyphenol, 2,6-di-(butylthiomethyl) - 4 - butoxyphenol, 2,6 - di - (amylthiomethyl)-4-butoxyphenol, 2,6-di-(hexylthiomethyl)-4-butoxyphenol, 2,6-di-(heptylthiomethyl)-4-butoxyphenol, 2,6-di-(octylthiomethyl)-4-butoxyphenol, etc., 2,6-di-(methylthiomethyl)-4-pentoxyphenol, 2,6-di-(ethylthiomethyl)-4-pentoxyphenol, 2,6-di-(propylthiomethyl)-4-pentoxyphenol, 2,6-di-(butylthiomethyl)-4-pentoxyphenol, 2,6-di-(amylthiomethyl) - 4 - pentoxyphenol, 2,6-di-(hexylthiomethyl)-4-pentoxyphenol, 2,6-di-(heptylthiomethyl)-4-pentoxyphenol, 2,6-di-(octylthiomethyl)-4-pentoxyphenol, etc., 2,3-di-alkylthioalkyl-4-alkoxyphenols, 2,5-di-alkylthioalkyl-4-alkoxyphenols, 2,3,5-tri-alkylthioalkyl-4-alkoxyphenols, 2,3,6-tri-alkylthioalkyl-4-alkoxyphenols, 2,-3,5,6-tetra-alkylthioalkyl-4-alkoxyphenols, etc.

Particularly preferred compounds comprise those in which R' comprises a branched chain radical and thus include compounds as 2-iso-propylthiomethyl-4-methoxyphenol, 2-tert-butyl-thiomethyl-4-methoxyphenol, 2-tert-amylthiomethyl-4-methoxyphenol, 2-tert-hexylthiomethyl-4-methoxyphenol, etc., 2-iso-propylthiomethyl-4-ethoxyphenol, 2-tert-butylthiomethyl-4-ethoxyphenol, 2-tert-amylthiomethyl-4-ethoxyphenol, 2-tert-hexylthiomethyl-4-ethoxyphenol, etc., 2-iso-propylthiomethyl-4-propoxyphenol, 2-tert-butylthiomethyl-4-propoxyphenol, 2-tert-amylthiomethyl-4-propoxyphenol, 2-tert-hexylthiomethyl-4-propoxyphenol, etc., 2-iso-propylthiomethyl-4-butoxyphenol, 2-tert-butylthiomethyl-4-butoxyphenol, 2-tert-amylthiomethyl-4-butoxyphenol, 2-tert-hexylthiomethyl-4-butoxyphenol, etc., 2,6-di-(iso-propylthiomethyl)-4-methoxyphenol, 2,6-di-(tert-butylthiomethyl)-4 - methoxyphenol, 2,6-di-(tert-amylthiomethyl) - 4 - methoxyphenol, 2,6-di-(tert-hexylthiomethyl)-4 - methoxyphenol, 2,6-di-(tert-heptylthiomethyl)-4-methoxyphenol, 2,6 - di-(tert-octylthiomethyl)-4-methoxyphenol, etc., 2,6-di-(iso-propylthiomethyl) - 4 - ethoxyphenol, 2,6-di-(tert-butylthiomethyl)-4-ethoxyphenol, 2,6 - di-(tert-amylthiomethyl)-4-ethoxyphenol, 2,6-di-(tert - hexylthiomethyl) - 4- ethoxyphenol, 2,6-di-(tert-heptylthiomethyl) - 4-ethoxyphenol, 2,6-di-(tert-octylthiomethyl)-4 - ethoxyphenol, etc., 2,6-di-(iso-propylthiomethyl)-4-propoxyphenol, 2,6-di-(tert-butylthiomethyl)-4-propoxyphenol, 2,6 - di-(tert-amylthiomethyl)-4-propoxyphenol, 2,6-di-(tert - hexylthiomethyl)-4 - propoxyphenol, 2,6-di - (tert-heptylthiomethyl)-4-propoxyphenol, 2,6 - di-(tert-octylthiomethyl)-4-propoxyphenol, etc., 2,6-di-(iso - propylthiomethyl)-4-butoxyphenol, 2,6-di-(tert-butylthiomethyl) - 4 - butoxyphenol, 2,6-di-(tert - amylthiomethyl) - 4 - butoxyphenol, 2,6-di-(tert-hexylthiomethyl)-4 - butoxyphenol, 2,6 - di-(tert-heptylthiomethyl)-4-butoxyphenol, 2,6 - di - (tert-octylthiomethyl)-4-butoxyphenol, etc.

Where R' in the above formula is a cycloalkyl group, the compound will comprise a cycloalkylthioalkyl alkoxyphenol and include such compounds as 2-cyclohexylthiomethyl-4-methoxyphenol, 2-cyclohexylthiomethyl-4 - ethoxyphenol, 2 - cyclohexylthiomethyl-4-propoxyphenol, 2-cyclohexylthiomethyl - 4-butoxyphenol, etc., 2,6-di-(cyclohexylthiomethyl) - 4 - ethoxyphenol, 2,6-di-(cyclohexylthiomethyl - 4 - propoxyphenol, etc., 2-cyclopentylthiomethyl-4-alkoxyphenols, 2,6 - di-(cyclopentylthiomethyl)-4-alkoxyphenols, etc. Where R' in the above formula comprises an aryl group the novel compound will comprise an arylthiomethyl-4-alkoxyphenol, and includes such compounds as 2-phenylthiomethyl-4-methoxyphenol, 2-phenylthiomethyl - 4 - ethoxyphenol, 2-phenylthiomethyl-4-propoxyphenol, 2-phenylthiomethyl-4-butoxyphenol, etc., 2,6-di-(phenylthiomethyl)-4-methoxyphenol, 2,6 - di-(phenylthiomethyl)-4-ethoxyphenol, 2,6-di - (phenylthiomethyl)-4-propoxyphenol, 2, 6 - di-(phenylthiomethyl)-4-butoxyphenol, etc., 2-naphthylthiomethyl - 4 - methoxyphenol, 2 - naphthylthiomethyl - 4 - ethoxyphenol, 2-naphthylthiomethyl - 4 - propoxyphenol, 2-naphthylthiomethyl-4-butoxyphenol, etc., 2, 6 - di-(naphthylthiomethyl)-4-methoxyphenol, 2,6-di - (naphthylthiomethyl) - 4-ethoxyphenol, 2,6 - di-(naphthylthiomethyl) - 4-propoxyphenol, 2,6-di - (naphthylthiomethyl) - 4-butoxyphenol, etc. Where R is an aralkyl group the compound may comprise 2 - benzylthiomethyl-4 - methoxyphenol, 2-phenylethylthiomethyl - 4 - methoxyphenol, 2-phenylpropylthiomethyl - 4 - methoxyphenol, and similarly compounds in which the alkoxy group is selected from ethoxy, propoxy, butoxy, pentoxy, etc. Where R' is an alkaryl group the compound includes 2-tolylthiomethyl - 4-methoxyphenol, 2-tolylthiomethyl - 4 - ethoxyphenol, 2-tolylthiomethyl-4-propoxyphenol, 2-tolylthiomethyl - 4 - butoxyphenol, 2-tolylthiomethyl - 4 - pentoxyphenol, 2-tolylthiomethyl-4-hexoxyphenol, etc., 2,6-di-(tolylthiomethyl) - 4 - methoxyphenol, 2,6-di-(tolylthiomethyl)-4-ethoxyphenol, 2,6-di-(tolylthiomethyl)-4-propoxyphenol, 2,6-di - (tolylthiomethyl) - 4 - butoxyphenol, 2,6-di-(tolylthiomethyl) - 4-pentoxyphenol, etc.

Other compounds comprise those containing at least one alkylthioalkyl substituent and at least one alkyl substituent replacing ring hydrogens of the alkoxyphenolic compound. Specific compounds in this class include 2-alkyl - 6 - alkylthioalkyl-4-methoxyphenols and still more particularly 2-iso-propyl-6-methylthiomethyl - 4-methoxyphenol, 2-tert-butyl-6 - methylthiomethyl - 4 - methoxyphenol, 2-tert-amyl - 6 - methylthiomethyl - 4-methoxyphenol, 2-tert-hexyl-6-methylthiomethyl - 4 - methoxyphenol, 2-tert-heptyl-6-methylthiomethyl - 4 - methoxyphenol, 2 - tert-octyl - 6-methylthiomethyl-4-methoxyphenol, etc., 2-iso - propyl - 6 - ethoxythiomethyl - 4-methoxyphenol, 2 - tert - butyl - 6 - ethylthiomethyl - 4-methoxyphenol, 2-tert-amyl-6-ethylthiomethyl - 4 - methoxyphenol, 2 - tert-hexyl - 6-ethylthiomethyl - 4 - methoxyphenol, 2 - tert-heptyl-6-ethylthiomethyl - 4 - methoxyphenol, 2-tert-octyl-6-ethylthiomethyl - 4 - methoxyphenol, etc., 2 - iso-propyl-6-propylthiomethyl-4-methoxyphenol, 2-tert-butyl-6-propylthiomethyl - 4 - methoxyphenol, 2-tert-amyl-6 - propylthiomethyl - 4 - methoxyphenol, 2-tert-hexyl-6-propylthiomethyl - 4 - methoxyphenol, 2-tert-heptyl - 6 - propylthiomethyl - 4 - methoxyphenol, 2-tert-octyl - 6 - propylthiomethyl - 4 - methoxyphenol, etc., 2 - iso-propyl - 6 - butylthiomethyl-4-methoxyphenol, 2-tert-butyl-6-butylthiomethyl - 4 - methoxyphenol, 2-tert-amyl - 6 - butylthiomethyl - 4 - methoxyphenol, 2-tert - hexyl - 6 - butylthiomethyl - 4 - methoxyphenol, 2-tert-heptyl - 6 - butylthiomethyl-4-methoxyphenol, 2-tert-octyl-6 - butylthiomethyl - 4 - methoxyphenol, etc., 2,5-di-iso - propyl - 6 - methylthiomethyl-4-methoxyphenol, 2,5-di-tert - butyl - 6 - methylthiomethyl - 4 - methoxyphenol, 2,5-di-tert-amyl-6 - methylthiomethyl - 4 - methoxyphenol, 2,5-di-tert-hexyl - 6-methylthiomethyl - 4 - methoxyphenol, 2,5-di-tert-heptyl-6-methylthiomethyl - 4 - methoxyphenol, 2,5-di-tert-octyl-6-methylthiomethyl - 4 methoxyphenol, etc., 2-iso-propyl-3,6-di-(methylthiomethyl)-4 - methoxyphenol, 2 - tert-butyl-3,6-di-(methylthiomethyl) - 4 - methoxyphenol, 2-tert-amyl-3,6-di-(methylthiomethyl) - 4 - methoxyphenol, etc., 2-iso-propyl - 3,6-di-(ethylthiomethyl)-4 - methoxyphenol, 2-tert-butyl-3,6-di-(ethylthiomethyl) - 4 - methoxyphenol, 2 - tert-amyl-3,6-di-(ethylthiomethyl) - 4-methoxyphenol, etc. and similarly substituted compounds in which the alkoxy group is selected from the ethoxy, propoxy, butoxy, pentoxy, etc.

The specific compounds hereinbefore set forth comprise those in which R is a methylene radical. It is understood that R may be selected from ethylene, propylene, butylene, amylene, hexylene, heptylene, octylene, etc. groups as well as from phenylene, naphthylene, cyclopentenyl, cyclohexenyl, etc. groups.

It is apparent that many compounds may be prepared and used in accordance with the present invention and it is understood that all of these compounds are not necessarily equivalent for any specific use. Furthermore, it is understood that when two or more substituent groups are utilized, these groups may be the same or different. While the 4-alkoxyphenol compounds are preferred, it is understood that compounds having the alkoxy group in the 2, 3, 5 or 6 positions are comprised within the scope of the present invention and also that, in some cases, two or more alkoxy groups may be employed.

The compounds of the present invention may be prepared in any suitable manner. In one method of preparation, the desired alkoxyphenol or alkylalkoxyphenol is reacted with formaldehyde or trioxymethylene and the desired mercaptan. This reaction is readily effected by refluxing the mixture in the presence of a suitable solvent such as benzene, toluene, xylene, etc. After the reaction is completed, water formed during the reaction and the aromatic solvent are removed by distillation, preferably in separate steps, and the product is finally purified by distillation under vacuum.

In another method of preparation, a suitable dimethyl amine derivative of the alkoxyphenol or alkylalkoxyphenol is reacted with the desired mercaptan, again by refluxing the mixture until the reaction is completed.

The following examples are introduced to illustrate further the novelty and utility of the present invention but not with the intention of unduly limiting the same.

EXAMPLE I 2-n-butylthiomethyl-4-methoxyphenol was prepared by the reaction of 2-di-methylaminomethyl-4-methoxyphenol with n-butyl mercaptan. The reaction was effected by refluxing the reactants at 93° C. for about 100 hours and subsequently distilling off the unreacted mercaptan and recovering the residue as the desired product. The product was a light red colored liquid boiling at 130–160° C. at 1 mm. pressure.

EXAMPLE II 2-tert-amylthiomethyl-4-methoxyphenol was prepared by refluxing 4-methoxyphenol with trioxymethylene and tert-amyl mercaptan in benzene. The water of reaction was removed by distilling off a water-benzene azeotrope and the product was finally distilled under vacuum. The product was a redish tan solid, melting point of 39–40° C.

EXAMPLE III 2-tert-butyl-6-tert-amylthiomethyl-4-methoxyphenol was prepared in substantially the same manner as described in Example II by refluxing 2-tert-butyl-4-methoxyphenol with trioxymethylene and tert-amyl mercaptan. The product was a redish tan solid, melting point of 60-63° C.

EXAMPLE IV 2-n-butylthiomethyl-4-methoxyphenol, prepared in accordance with Example I, was utilized for the stabilization of lard having a stability period of 2½ hours. 0.02% by weight of the additive increased the stability period of the lard to about 32 hours.

EXAMPLE V 0.02% by weight of 2-tert-amylthiomethyl-4-methoxyphenol, prepared in accordance with Example II, increased the stability period of another sample of the lard to about 29 hours.

EXAMPLE VI 0.02% by weight of 2-tert-butyl-6-tert-amylthiomethyl-4-methoxyphenol, prepared in accordance with Example III, increased the stability period of another sample of the lard to about 30 hours.

EXAMPLE VII

As hereinbefore set forth, the compounds of the present invention may be used as synergists when used along with known antioxidants. The following table shows the synergistic effect of 2-n-butylthiomethyl-4-methoxyphenol with various antioxidants.

Table I

| 0.0025% of 2-n-butylthiomethyl-4-methoxyphenol with 0.0025% of— | Stability Time (Hours) | | | |
|---|---|---|---|---|
| | Actual | Actual Increase | Expected Increase | Difference |
| propyl gallate | 45 | 29 | 11.5 | 17.5 |
| 1,7-dihydroxynaphthalene | 50 | 34 | 10 | 24 |
| N. D. G. A. | 51 | 34 | 9½ | 24½ |
| 2-tert-butyl-4-methoxyphenol | 41 | 25 | 9 | 16 |

The expected result is computed on the basis of ½ of the actual increase in the stability time obtained with 0.005% of the additive in view of the fact that only ½ as much of each additive was utilized. For example, with reference to the test employing the synergist and propyl gallate, propyl gallate alone in a concentration of 0.005% by weight gave 37 hours for an increase of 21 hours over the 16 hours stability period of the uninhibited lard. The synergist alone in 0.005% concentration gave a stability time of 18 hours which is an increase of 2 hours over the uninhibited stability period of the lard. ½ of 21 equal 10½ and ½ of 2 equals 1, which together gives an expected increase of approximately 11.5 hours as shown in the above table. It will be noted that the synergist along with the oxidation inhibitors gave stability times in excess of that calculated or expected by the sum total effect of each of the additives.

I claim as my invention:
1. 2-n-butylthiomethyl-4-methoxyphenol.
2. 2-tert-butylthiomethyl-4-methoxyphenol.
3. 2-tert-amylthiomethyl-4-methoxyphenol.
4. 2-tert-butyl-6-tert-amylthiomethyl-4-methoxyphenol.
5. 2-tert-butylthiomethyl-4-ethoxyphenol.
6. Alkylthiomethyl-4-alkoxyphenol in which the alkoxy radical contains from 1 to 5 carbon atoms and the alkyl radical of the alkylthiomethyl group is a lower alkyl radical.
7. Alkylthiomethyl-4-methoxyphenol in which the alkyl radical of the alkylthiomethyl group is a lower alkyl radical.
8. 2-alkylthiomethyl-4-alkoxyphenol in which the alkoxy radical contains from 1 to 5 carbon atoms and the alkyl radical of the alkylthiomethyl group is a lower alkyl radical.
9. 2-alkylthiomethyl-4-methoxyphenol in which the alkyl radical of the alkylthiomethyl group is a lower alkyl radical.

References Cited in the file of this patent

UNITED STATES PATENTS

| | | |
|---|---|---|
| 2,124,749 | Salzberg | July 26, 1938 |
| 2,310,710 | Rosenwald et al. | Feb. 9, 1943 |
| 2,417,118 | McCleary et al. | Mar. 11, 1947 |
| 2,526,755 | Kluge et al. | Oct. 24, 1950 |
| 2,668,768 | Chenicek | Feb. 9, 1954 |